United States Patent
Yoshiyuki (10) Patent No.: US 8,911,894 B2
(45) Date of Patent: Dec. 16, 2014

(54) BATTERY ASSEMBLY

(75) Inventor: Nakamura Yoshiyuki, Nishikamo-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1357 days.

(21) Appl. No.: 12/307,478

(22) PCT Filed: Jun. 14, 2007

(86) PCT No.: PCT/JP2007/062474
§ 371 (c)(1),
(2), (4) Date: Jan. 5, 2009

(87) PCT Pub. No.: WO2008/010381
PCT Pub. Date: Jan. 24, 2008

(65) Prior Publication Data
US 2009/0286141 A1   Nov. 19, 2009

(30) Foreign Application Priority Data

Jul. 19, 2006   (JP) .................. 2006-196980

(51) Int. Cl.
*H01M 10/50* (2006.01)
*H01M 10/6553* (2014.01)
(Continued)

(52) U.S. Cl.
CPC ...... *H01M 10/0565* (2013.01); *H01M 10/5051* (2013.01); *H01M 2/305* (2013.01); *H01M 10/5004* (2013.01); *H01M 10/5073* (2013.01); *H01M 10/052* (2013.01); *H01M 10/0585* (2013.01); *H01M 10/5067* (2013.01); *H01M 2/30* (2013.01); *H01M 2/266* (2013.01); *Y02E 60/122* (2013.01); *Y02T 10/7011* (2013.01); *H01M 4/70* (2013.01); *H01M 10/5032* (2013.01); *H01M 10/0562* (2013.01); *H01M 2/0212* (2013.01); *H01M 10/0413* (2013.01)
USPC ........................................ 429/120

(58) Field of Classification Search
USPC ........................... 429/82, 162, 120
See application file for complete search history.

(56) References Cited

U.S. PATENT DOCUMENTS 5,800,942 A * 9/1998 Hamada et al. ............. 429/148
2002/0195990 A1 * 12/2002 Yang ........................... 320/107
(Continued)

FOREIGN PATENT DOCUMENTS

EP    1 326 294 A2    7/2003
EP    1 478 035 A2    11/2004
(Continued)

OTHER PUBLICATIONS

Supplementary European Search Report dated Feb. 15, 2012.

*Primary Examiner* — Muhammad Siddiquee
(74) *Attorney, Agent, or Firm* — Kenyon & Kenyon LLP (57) ABSTRACT

A battery assembly of the invention includes a secondary battery formed by stacking a plurality of unit battery cells having a cathode and an anode, collector electrodes provided on respective end surfaces of the secondary battery positioned in the stacking direction of the unit battery cells; and terminal portions formed at the collector electrodes, protruded outward from a side surface of the secondary battery, to which conductive members are connected for charging and discharging. A coolant is supplied to the terminal portions to cool the terminal portions.

4 Claims, 7 Drawing Sheets

(51) Int. Cl.
*H01M 2/30* (2006.01)
*H01M 10/613* (2014.01)
*H01M 10/6566* (2014.01)
*H01M 10/052* (2010.01)
*H01M 10/0585* (2010.01)
*H01M 10/6563* (2014.01)
*H01M 2/26* (2006.01)
*H01M 4/70* (2006.01)
*H01M 10/647* (2014.01)
*H01M 10/0562* (2010.01)
*H01M 10/0565* (2010.01)
*H01M 2/02* (2006.01)
*H01M 10/04* (2006.01)

(56) References Cited

U.S. PATENT DOCUMENTS

| | | | |
|---|---|---|---|
| 2003/0008205 | A1 | 1/2003 | Horie et al. |
| 2003/0072998 | A1 | 4/2003 | Fredriksson et al. |
| 2004/0161667 | A1* | 8/2004 | Fukuzawa et al. ............ 429/210 |
| 2004/0229117 | A1 | 11/2004 | Mitani et al. |
| 2005/0074666 | A1 | 4/2005 | Kimiya et al. |

FOREIGN PATENT DOCUMENTS

| | | |
|---|---|---|
| JP | 2001-060465 A | 3/2001 |
| JP | 2002-056904 A | 2/2002 |
| JP | 2002-075324 A | 3/2002 |
| JP | 2003-017127 A | 1/2003 |
| JP | 2003-346924 A | 12/2003 |
| JP | 2004-031281 A | 1/2004 |
| JP | 2004-087238 A | 3/2004 |
| JP | 2004-319362 A | 11/2004 |
| JP | 2005-56655 A | 3/2005 |
| JP | 2005-71784 A | 3/2005 |
| JP | 2005-100926 A | 4/2005 |
| JP | 2005-135743 A | 5/2005 |
| JP | 2005-302698 A | 10/2005 |
| JP | 2005-353536 A | 12/2005 |
| JP | 2006-48996 A | 2/2006 |
| JP | 3-755591 B2 | 3/2006 |
| JP | 2006-66083 A | 3/2006 |

* cited by examiner

BATTERY ASSEMBLY

This is a 371 national phase application of PCT/JP2007/062474 filed 14 Jun. 2007, claiming priority to Japanese Patent Application No. 2006-196980 filed 19 Jul. 2006, the contents of which are incorporated herein by reference.

FIELD OF THE INVENTION

The present invention relates to a battery assembly formed by stacking a plurality of secondary batteries.

BACKGROUND OF THE INVENTION

Conventionally, a battery assembly formed by stacking a plurality of battery cells has been proposed as a storage battery. A battery cell includes a plate-shaped electrolyte, having a cathode active material formed on a main surface and an anode active material formed on the other main surface. The battery cells as such are arranged in series and a collector plate is placed between each of the battery cells, whereby a battery assembly is formed. In the battery assembly formed in this manner, electrode reaction takes place between the cathode active material and the anode active material in each battery cell, to discharge power.

Japanese Patent Laying-Open Nos. 2005-071784, 2004-031281 and 2002-056904 propose various types of battery assemblies and cooling structures therefor, for cooling heat generated by the electrode reaction. For instance, Japanese Patent Laying-Open No. 2005-071784 proposes a battery assembly and its cooling structure, in which a cooling tab is attached to each collector plate arranged between battery cells, and by blowing cooling air to the tab, each collector plate is cooled and hence the battery assembly is cooled.

In the battery assembly mentioned above, however, a separate cooling tab is attached to each cooling plate and, therefore, the number of components increases, resulting in higher cost.

SUMMARY OF THE INVENTION

The present invention was made in view of the problem described above, and its object is to provide a battery assembly whose inside can be cooled at a low cost, without increasing the number of components.

The present invention provides a battery assembly, including: a secondary battery formed by stacking a plurality of unit battery cells having a cathode and an anode; a collector electrode provided on each end surface of the secondary battery positioned in the stacking direction of the unit battery cells; and a terminal portion formed at the collector electrode, protruded outward from a side surface of the secondary battery, to which a conductive member is connected for charging and discharging; wherein a coolant is supplied to the terminal portion to cool the terminal portion, and a vent hole is formed in the terminal portion T1, allowing flow of the coolant.

Preferably, it further includes a guide wall formed around the vent hole, guiding the coolant to the vent hole. Preferably, it further includes a connecting portion formed at the terminal portion, to which the conductive member is connected, and the vent hole is formed around the connecting portion.

According to another aspect, the present invention provides a battery assembly, including: a secondary battery formed by stacking a plurality of unit battery cells having a cathode and an anode; a collector electrode provided on each end surface of the secondary battery positioned in the stacking direction of the unit battery cells; and a terminal portion formed at the collector electrode, protruded outward from a side surface of the secondary battery, to which a conductive member is connected for charging and discharging; wherein a coolant is supplied to the terminal portion to cool the terminal portion, the secondary battery includes first and second secondary batteries stacked to have the cathodes opposed to each other or the anodes opposed to each other; the collector electrode has a first collector electrode provided between the first secondary battery and the second secondary battery for electrically connecting the first secondary battery and the second secondary battery, and a second collector electrode of a polarity different from that of the first collector electrode, formed on a surface of the first secondary battery positioned opposite to the surface on which the first collector electrode is formed; and the terminal portion has a first terminal portion provided on the first collector electrode and a second terminal portion provided on the second collector electrode.

According to a further aspect, the present invention provides a battery assembly, comprising: a secondary battery formed by stacking a plurality of unit battery cells having a cathode and an anode; a collector electrode provided on each end surface of the secondary battery positioned in the stacking direction of the unit battery cells; and a terminal portion formed at the collector electrode, protruded outward from a side surface of the secondary battery, to which a conductive member is connected for charging and discharging; wherein a coolant is supplied to the terminal portion to cool the terminal portion; further including a collector foil provided between the unit battery cells; wherein the collector electrode is formed to be thicker than the collector foil.

In the battery assembly in accordance with the present invention, the terminal portion, which is an essential component of the battery assembly, is also used as the cooling plate and, therefore, the battery assembly can well be cooled without increasing the number of components and cost.

DETAILED DESCRIPTION (Embodiment 1)

Referring to FIGS. 1 to 6, a battery assembly 100 in accordance with Embodiment 1 of the present invention will be described.

Figure 1:
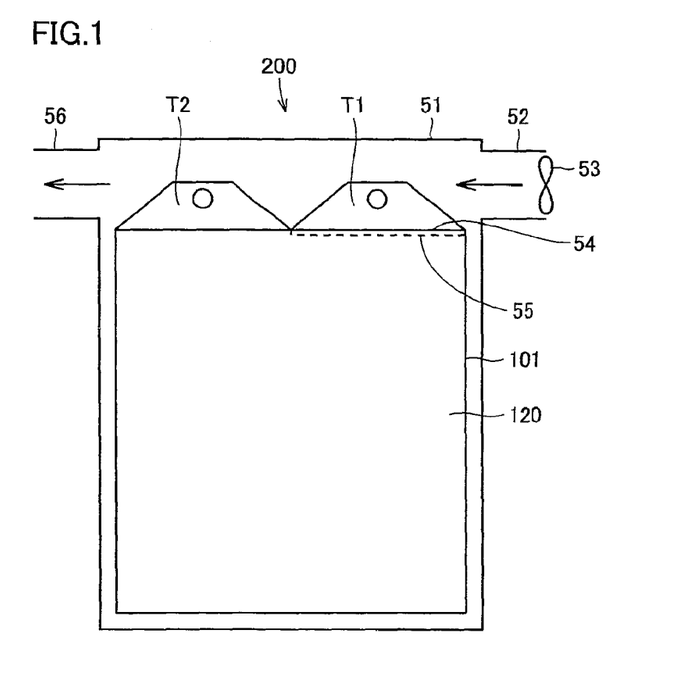
FIG. 1 is a plan view of the cooling apparatus for a battery assembly.
Figure 2:
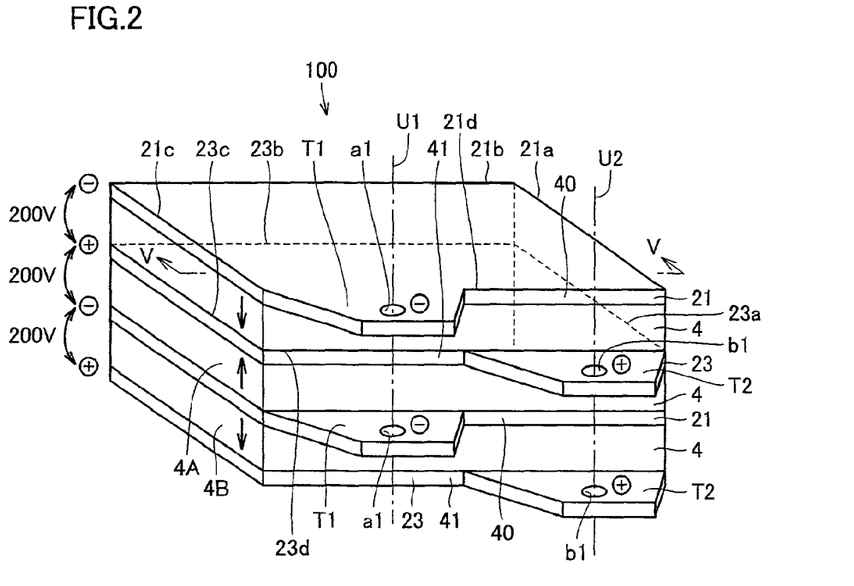
FIG. 2 is a perspective view of the battery assembly.

FIG. 1 is a plan view of a cooling apparatus 200 arranged around a battery pack 120 containing the battery assembly, for cooling a terminal portion of the battery assembly, and FIG. 2 is a perspective view of battery assembly 100 in accordance with Embodiment 1.

Cooling apparatus 200 of battery assembly 100 includes a housing 51 housing battery pack 120 therein, and a fan 53 for supplying outer air through an air intake duct 52 provided on housing 51.

Battery pack 120 is formed to have a substantially rectangular parallelepiped shape, and includes a casing 101 containing battery assembly 100 therein, and battery assembly 100. Battery pack 120 has a plurality of terminal portions T1 and T2 protruding outward from casing 101, on one side surface of battery pack 120. Fan 53 blows air (coolant) to terminal portions T1 and T2, so that terminal portions T1 and T2 are cooled and, consequently, battery assembly 100 is cooled.

As shown in FIG. 2, battery assembly 100 is formed by stacking a plurality of bipolar secondary batteries 4, a plurality of negative collector electrodes 21 and a plurality of positive collector electrodes 23.

Terminal portions T1 and T2 are formed at negative collector electrode 21 and positive collector electrode 23, and wires (conductive members) U1 and U2 for discharging and supplying power shown in FIG. 2 are connected. Terminal portions T1 and T2 are essential components for battery assembly 100 to function as a storage battery, and by utilizing terminal portions T1 and T2 as cooling plates, it becomes possible to cool battery assembly 100 without increasing the number of components of battery assembly 100.

Terminal portion (first terminal portion) T1 is integrally molded with negative collector electrode 21, and terminal portion (second terminal portion) T2 is integrally molded with positive collector electrode 23. When terminal portions T1 and T2 are formed integral with collector electrodes 21 and 23, respectively, efficiency of heat transfer can be improved than, for example, when terminal portions T1 and T2 are formed separate from negative collector electrode 21 and positive collector electrode 23 and connected by using solder, and therefore, inside of battery assembly 100 can better be cooled.

Terminal portion T1 has a connection hole (connection portion) a1 to which wire U1 is connected, and terminal portion T2 has a connection hole b1 to which wire U2 is connected.

Wires U1 and U2 are used for discharging electric power from battery assembly 100 to the outside or for charging battery assembly 100, and connect battery assembly 100, for example, to a PCU (Power Control Unit). In Embodiment 1, lead wires or the like are used as wires U1 and U2. These are not limiting, and any conductive member such as a conductive pin, may be used.

Terminal portions T1 and T2 are formed alternately, shifted in the direction of main surface of negative collector electrode 21 and positive collector electrode 23.

Therefore, it is possible to form connection hole a1 at a position of terminal portion T1 away from terminal portion T2 and to form connection hole b1 at a position of terminal portion T2 away from terminal portion T1. This facilitates connection of wires U1 and U2 to connection holes a1 and b1.

Terminal portions T1 are arranged to be overlapped in the stacking direction, and connection holes a1 formed in each of the terminal portions T1 are also aligned in the stacking direction. Therefore, by putting wire U1 through each of the connection holes a1 aligned in the stacking direction, all negative collector electrodes 21 can easily be connected.

Similarly, terminal portions T2 are arranged to be overlapped in the stacking direction, and connection holes b1 are also aligned in the stacking direction. Therefore, by putting wire U2 through each of the connection holes b1 aligned in the stacking direction, all positive collector electrodes 23 can easily be connected.

At that portion of negative collector electrode 21 which is adjacent to terminal portion T1, a cut-out portion 40 is formed, and in the stacking direction of cut-out portions 40, terminal portion T2 of positive collector electrode 23 is positioned. Further, at that portion of positive collector electrode 23 which is adjacent to terminal portion T2, a cut-out portion 41 is formed, and in the stacking direction of cut-out portions 41, terminal portion T1 of negative collector electrode 21 is positioned. Therefore, even when terminal portions T1 and T2 are bent or curved in the stacking direction, contact between terminal portions T1 and T2 can be prevented.

Terminal portions T1 and T2 are formed on one side surface of battery assembly 100 and, therefore, it is possible to arrange other member or members near other circumferential surfaces of battery assembly 100. Therefore, dead space can be reduced.

In the example shown in FIG. 2, negative collector electrode 21 and positive collector electrode 23 are formed to have a substantially rectangular shape having sides $21a$ to $21d$ and $23a$ to $23d$, and provided with terminal portions T1 and T2 protruded outward from sides $21d$ and $23d$.

Terminal portions T1 and T2 are formed to extend from end portions of sides $21d$ and $23d$ to the central portions of sides $21d$ and $23d$, and terminal portions T1 and T2 are arranged not be overlapped in the stacking direction of bipolar secondary batteries 4.

Figure 3:
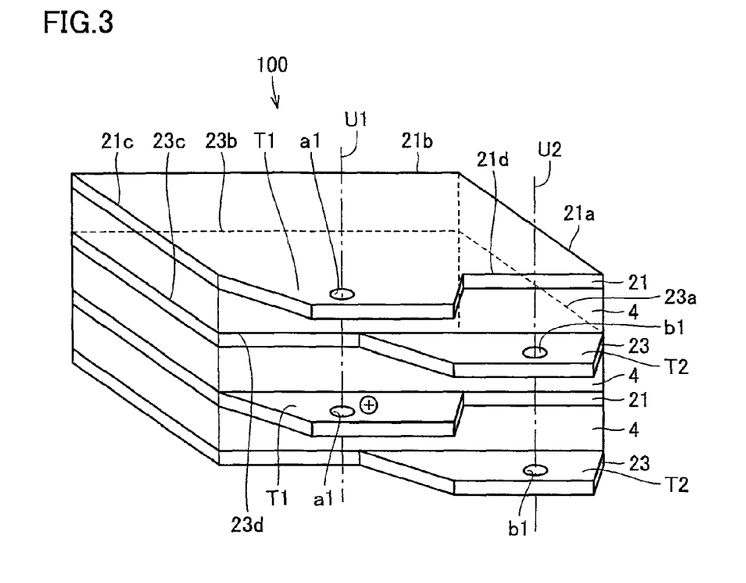
FIG. 3 is a perspective view showing a first modification of the battery assembly.

The shape of terminal portions T1 and T2 is not limited to the above. By way of example, FIG. 3 is a perspective view showing a first modification of battery assembly 100, and as shown in FIG. 3, terminal portions T1 and T2 may extend from one end to the other end of sides $21d$ and $23d$, and terminal portions T1 and T2 may partially overlap in the stacking direction of bipolar secondary batteries 4.

By forming terminal portions T1 and T2 in this manner, surface areas of terminal portions T1 and T2 can be increased, whereby cooling effect can be improved.

Figure 4:
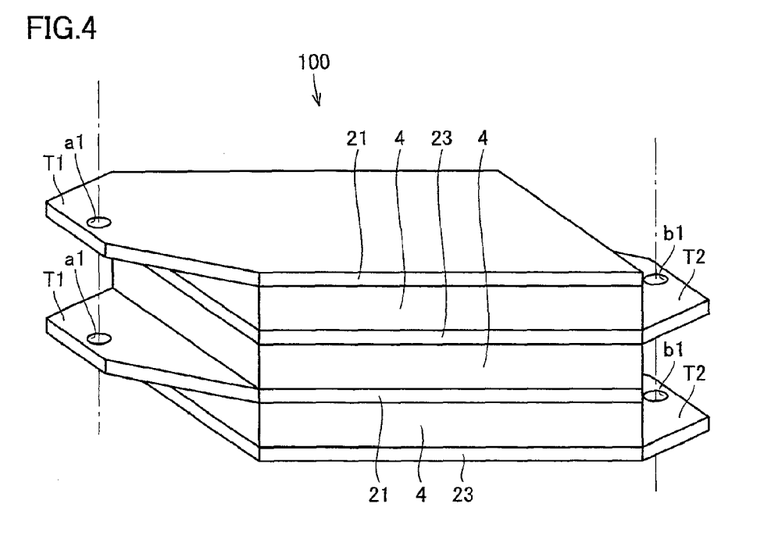
FIG. 4 is a perspective view showing a second modification of the battery assembly.

FIG. 4 is a perspective view showing a second modification of battery assembly 100 and, as shown in FIG. 4, terminal portions T1 and T2 may be formed to extend over opposite ends of negative collector electrode 21 and positive collector electrode 23.

By forming terminal portions T1 and T2 in this manner, it becomes possible to ensure larger surface area of terminal portions T1 and T2 and, therefore, cooling effect can further be improved.

When terminals T1 and T2 are formed over opposite ends of sides, terminal portions T1 and T2 are formed on different side surfaces of battery assembly 100, to facilitate routing of wires U1 and U2.

Further, surface areas of terminal portions T1 and T2 positioned at the central portion in the thickness direction of battery assembly 100 may be made larger than the surface areas of terminal portions T1 and T2 positioned at opposite ends in the thickness direction of battery assembly 100. This improves heat radiation near the central portion in the thickness direction of battery assembly 100, to prevent heat build-up in battery assembly 100.

Figure 5:
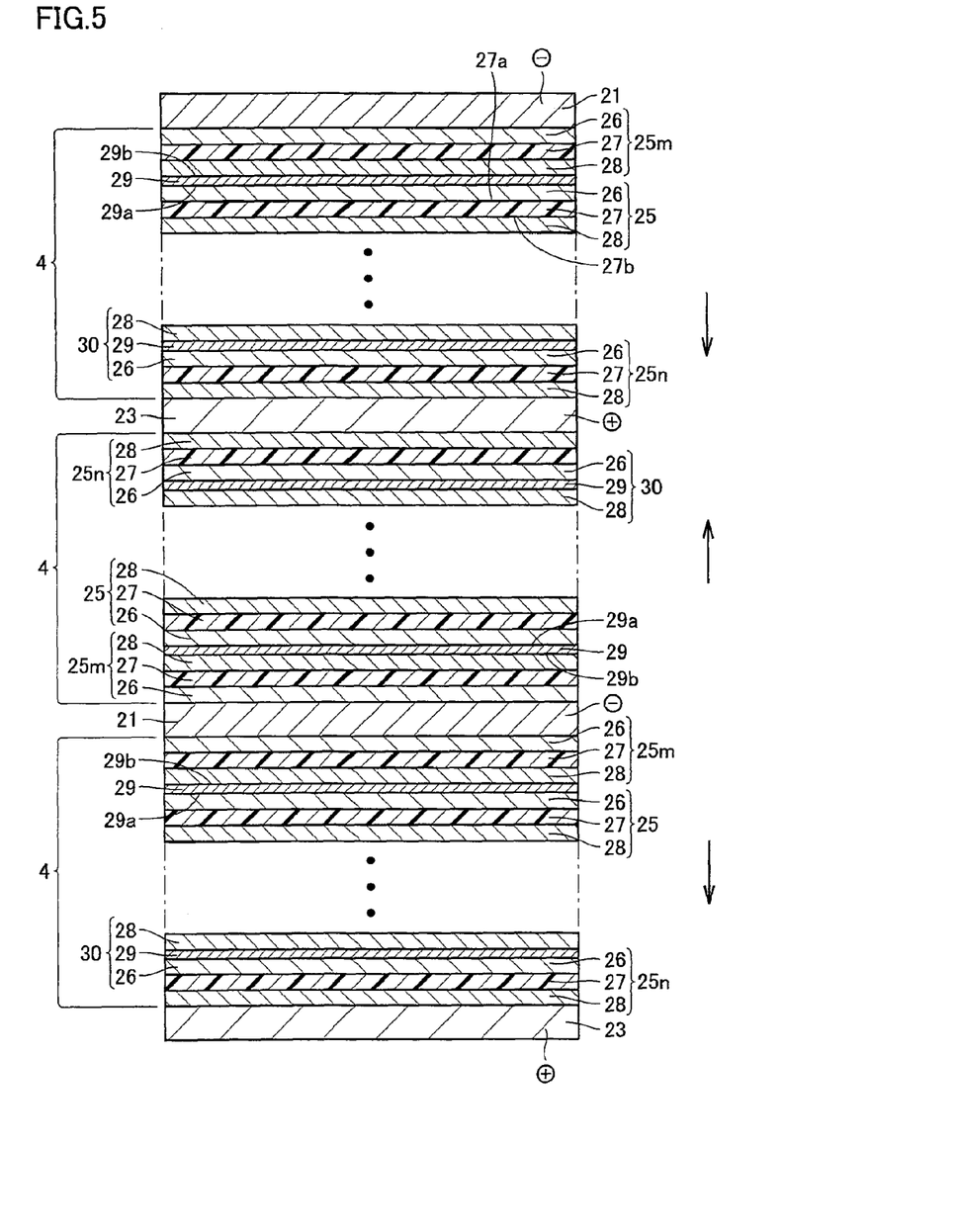
FIG. 5 is a cross-sectional view showing in detail an internal structure of the battery assembly.

FIG. 5 is a cross-sectional view showing in detail the structure in battery assembly 100. As shown in FIG. 5, bipolar secondary battery 4 is formed by successively stacking a plurality of electrode sheets (unit battery cells) 25 and collector foils 29 provided between each of the electrode sheets 25. The direction of stacking respective electrode sheets 25 is the same as the direction of stacking bipolar secondary batteries 4, and both correspond to the thickness direction of battery assembly 100.

Electrode sheet 25 includes an electrolyte layer 27 formed as a plate, an anode active material layer 26 formed on one main surface (first main surface) 27a of electrolyte layer 27, and a cathode active material layer 28 formed on the other main surface (second main surface) 27b of electrolyte layer 27. Electrode sheets 25 are stacked in series one after another with collector foil 29 inserted therebetween.

A plurality of bipolar secondary batteries 4 are stacked with the plate-shaped negative collector electrode 21 or the plate-shaped positive collector electrode 23 interposed. Negative collector electrode 21 and positive collector electrode 23 are arranged between bipolar secondary batteries 4 stacked such that cathode active materials (cathodes) 28 oppose to each other or anode active materials (anodes) 26 oppose to each other, to connect bipolar secondary batteries 4 with each other, and also provided at opposite ends of battery assembly 100 in the stacking direction of bipolar secondary batteries.

On a main surface of negative collector electrode 21 provided on one end of battery assembly 100, anode active material layer 26 of bipolar secondary battery 4 adjacent in the stacking direction is formed, and on a main surface of positive collector electrode 23 provided on the other end, cathode active material layer 28 of bipolar secondary battery 4 adjacent in the stacking direction is formed.

Referring to FIG. 2, by way of example, among the plurality of bipolar secondary batteries 4, negative collector electrode (first collector electrode) 21 is provided between bipolar secondary battery (first secondary battery) 4A and bipolar secondary battery (second secondary battery) 4B. On that surface of bipolar secondary battery 4A which is positioned opposite to the surface of bipolar secondary battery 4A having negative collector electrode 21 formed thereon, a positive collector electrode (second collector electrode) 23 is provided.

Bipolar secondary batteries 4 adjacent to each other with positive collector electrode 23 interposed are arranged such that cathode active material layers (cathodes) 28 oppose to each other as shown in FIG. 5, and on the front and rear surfaces of positive collector electrode 23, cathode active material layers 28 of adjacent bipolar secondary batteries are connected. Further, bipolar secondary batteries 4 adjacent to each other with negative collector electrode 21 interposed are arranged such that anode active material layers 26 oppose to each other, and on the front and rear surfaces of negative collector electrode 21, anode active material layers 26 of adjacent bipolar secondary batteries are connected. Specifically, bipolar secondary electrodes 4 are connected in parallel with each other.

Bipolar secondary batteries 4 positioned on opposite sides of positive collector electrode 23 or negative collector electrode 21 in the stacking direction share the positive collector electrode 23 or negative collector electrode 21. Therefore, as compared with a conventional battery assembly formed by stacking a plurality of bipolar secondary batteries one after another with an insulating film interposed, the insulating film becomes unnecessary, and as the neighboring secondary batteries share the collector electrode, battery assembly 100 itself can be made compact.

Referring to FIG. 5, electrolyte layer 27 forming the electrode sheet 25 is formed of a material having ion conductivity. Electrolyte layer 27 may be solid electrolyte, or gel electrolyte. By interposing electrolyte layer 27, ion conduction between cathode active material layer 28 and anode active material layer 26 becomes smooth, and output of bipolar secondary battery 4 can be improved. By a collector foil 29 formed on each electrode sheet 25, cathode active material layer 28 formed by sputtering on one main surface 29b of collector foil 29 and anode active material layer 26 formed on the other main surface 29, a bipolar electrode 30 is formed.

Here, thickness of positive collector electrode 23 and negative collector electrode 21 provided on end surfaces at the ends in the stacking direction of electrode sheets 25 of bipolar secondary batteries 4 is made thicker than collector foil 29 formed in each bipolar secondary battery 4.

Therefore, when terminal portions T1 and T2 formed at positive collector electrode 23 and negative collector electrode 21 function as heat radiating plates, higher effect of heat radiation can be attained than when part of collector foil 29 is protruded from bipolar battery 4 and used as a heat radiating plate.

Casing 101 shown in FIG. 1 has an opening 54 to which terminal portions T1 and T2 are inserted. Around opening 54, a seal member 55 is provided to keep air-tightness of casing 101. It is noted that when a part of collector foil 29 is to be used as a heat radiating plate, a large number of openings must be formed in casing 101 and, therefore, it is very difficult to ensure air-tightness of casing 101.

Next, each of the components forming bipolar secondary battery 4 will be described in detail. Collector foil 29 is formed, by way of example, of aluminum. Here, even if the active material layer provided on the surface of collector foil 29 contains solid polymer electrolyte, it is possible to ensure sufficient mechanical strength of collector foil 29. Collector foil 29 may be formed by providing aluminum coating on metal other than aluminum, such as copper, titanium, nickel, stainless steel (SUS) or an alloy of these.

Cathode active material layer 28 includes a cathode active material layer and a solid polymer electrolyte. Cathode active material layer 28 may contain a supporting electrolyte (lithium salt) for improving ion conductivity, a conduction assistant for improving electron conductivity, NMP (N-methyl-2-pyrolidone) as a solvent for adjusting slurry viscosity, AIBN (azobisisobutyronitrile) as a polymerization initiator or the like.

As the cathode active material, composite oxide of lithium and transition metal generally used in a lithium ion secondary battery may be used. Examples of the cathode active material may include Li/Co based composite oxide such as $LiCoO_2$, Li/Ni based composite oxide such as $LiNiO_2$, Li/Mn based composite oxide such as spinel $LiMn_2O_4$, and Li/Fe based composite material such as $LiFeO_2$. Other examples are sulfated compound or phosphate compound of lithium and transition metal such as $LiFePO_4$; sulfide or oxide of transition metal such as $V_2O_5$, $MnO_2$, $TiS_2$, $MoS_2$ and $MoO_3$; $PbO_2$, AgO, NiOOH and the like.

The solid polymer electrolyte is not specifically limited and it may be any ion-conducting polymer. For example, polyethylene oxide (PEO), polypropylene oxide (PPO) or copolymer of these may be available. Such a polyalkylene oxide based polymer easily dissolves lithium salt such as $LiBF_4$, $LiPF_6$, $LiN(SO_2CF_3)_2$, or $LiN(SO_2C_2F_5)_2$. The solid polymer electrolyte is included in at least one of cathode active material layer 28 and anode active material layer 26. More preferably, the solid polymer electrolyte is included both in cathode active material layer 28 and anode active material layer 26.

As the supporting electrolyte, $Li(C_2F_5SO_2)_2N$, $LiBF_4$, $LiPF_6$, $LiN(SO_2C_2F_5)_2$ or a mixture of these may be used. As the electron conduction assistant, acethylene black, carbon black, graphite or the like may be used.

Anode active material layer 26 includes an anode active material layer and a solid polymer electrolyte. Anode active material layer may contain a supporting electrolyte (lithium salt) for improving ion conductivity, a conduction assistant for improving electron conductivity, NMP (N-methyl-2-pyrolidone) as a solvent for adjusting slurry viscosity, AIBN (azobisisobutyronitrile) as a polymerization initiator or the like.

As the anode active material layer, a material generally used in a lithium ion secondary battery may be used. If a solid electrolyte is used, however, it is preferred to use a composite oxide of carbon or lithium and metal oxide or metal, as the anode active material layer. More preferably, the anode active material layer is formed of a composite oxide of carbon or lithium and transition metal. Further preferably, the transition metal is titanium. Specifically, it is more preferred that the anode active material layer is of a composite oxide of titanium and lithium or a titanium oxide.

As the solid electrolyte forming electrolyte layer 27, by way of example, a solid polymer electrolyte such as polyethylene oxide (PEO), polypropylene oxide (PPO) or copolymer of these may be used. The solid electrolyte contains supporting electrolyte (lithium salt) for ensuring ion conductivity. As the supporting salt, $LiBF_4$, $LiPF_6$, $LiN(SO_2CF_3)_2$, $LiN(O_2C_2F_5)_2$ or a mixture of these may be used.

Specific examples of materials for cathode active material layer 28, anode active material layer 26 and electrolyte layer 27 are listed in Tables 1 to 3. Table 1 shows specific examples when electrolyte layer 27 is of an organic solid electrolyte, Table 2 shows specific examples when electrolyte layer 27 is of an inorganic solid electrolyte, and Table 3 shows specific examples when electrolyte layer 27 is of a gel electrolyte.

TABLE 1

| Cathode material | Anode material | Solid electrolyte | Remarks |
|---|---|---|---|
| $LiMn_2O_4$ | Li metal | P(EO/MEEGE) | electrolyte salt: $LiBF_4$ |
| — | Li metal | P(EO/PEG-22) | electrolyte salt: $LiN(CF_3SO_2)_2$(LiTFSI) |
| $LiCoO_2$ | carbon | PVdF base | — |
| $LiCoO_2$ | Li metal | ether based polymer P(EO/EM/AGE) | electrolyte salt: LiTFSI<br>ion conducting material binder: mix P(EO/EM) + $LiBF_4$ to cathode |
| $Li_{0.33}MnO_2$ | Li metal | P(EO/EM/AGE) | electrolyte salt: LiTFSI<br>ion conducting material binder: mix PEO-based solid polymer + LiTFSI to cathode |
| $Li_{0.33}MnO_2$ | Li metal | PEO base + inorganic additive | electrolyte salt: $LiClO_4$<br>ion conducting material: mix KB + PEG + LiTFSI to cathode |
| — | — | PEG-PMMA + PEG-borate ester | electrolyte salt: LiTFSI, BGBLi |
| — | — | PEO base + 10 mass %$0.6Li_2S + 0.4SiS_2$ | electrolyte salt: $LiCF_3SO_3$ |
| — | Li metal | PEO base + perovskite type $La_{0.55}Li_{0.35}TiO_3$ | electrolyte salt: $LiCF_3SO_3$ |
| Li metal | — | styrene/ethylene oxide-block-graft polymer(PSEO) | electrolyte salt: LiTFSI<br>ion conducting material: mix KB + PVdF + PEG + LiTFSI to cathode |
| $LiCoO_2$ | Li metal | P(DMS/EO) + polyether cross link | — |
| $Li_{0.33}MnO_2$ | Li metal | prepolymer composition mainly consisting of urethane acrylate (PUA) | electrolyte salt: LiTFSI<br>ion conducting material: mix KB + PVdF + PEG + LiTFSI to cathode |
| — | — | multibranched graft polymer (MMA + CMA + POEM) | electrolyte salt: $LiClO_4$ |
| $LiNi_{0.8}Co_{0.2}O_2$ | Li metal | PEO/multibranched polymer/filler based composite solid electrolyte (PEO + HBP + $BaTiO_3$) | electrolyte salt: LiTFSI<br>mix SPE + AB to cathode |
| — | — | PME400 + 13 group metal alkoxide (as Lewis acid) | electrolyte salt: LiCl |
| — | — | matrix containing poly (N-methylvinylimidazoline) (PNMVI) | electrolyte salt: $LiClO_4$ |
| $LiCoO_2$ | Li metal | polymerize methoxy polyethylene glycol monomethyl meso acrylate using ruthenium complex by living radical polymerization, further polymerize with styrene | electrolyte salt: $LiClO_4$<br>cathode conducting material KB + binder PVdF |
| $LiCoO_2$ | Li metal | P(EO/EM) + ether based plasticizer | electrolyte salt: LiTFSI<br>cathode conducting material KB + binder PVdF |

TABLE 2

| Cathode material | Anode material | Solid Electrolyte | Remarks |
|---|---|---|---|
| $LiCoO_2$ | In | $95(0.6Li_2S \cdot 0.4SiS_2) \cdot 5Li_4SiO_4$<br>($Li_2S$—$SiS_2$ based melt rapid cooled glass) | state: glass |
| — | — | $70Li_2S \cdot 30P_2S_5Li_{1.4}P_{0.6}S_{2.2}$ sulfide glass<br>($Li_2S$—$P_2S_5$ based glass ceramics) | state: glass<br>forming method: mechanochemical |
| — | — | $Li_{0.35}La_{0.55}TiO_3$(LLT)<br>(perovskite type structure) | state: ceramics<br>form solid electrolyte porous body, fill pores with active material sol |
| — | — | $80Li_2S \cdot 20P_2S_5$ | state: glass |

TABLE 2-continued

| Cathode material | Anode material | Solid Electrolyte | Remarks |
|---|---|---|---|
| | | ($Li_2S$—$P_2S_5$ based glass ceramics) | forming method: mechanochemical |
| — | — | $xSrTiO_3 \cdot (1-x)LiTaO_3$ (perovskite type oxide) | state: ceramics |
| $LiCoO_2$ | Li—In metal | $Li_{3.4}Si_{0.4}P_{0.6}S_4$ (thio-LISICON Li ion conductor) | state: ceramics |
| — | — | $(Li_{0.1}La_{0.3})_xZr_yNb_{1-y}O_3$ (perovskite type oxide) | state: ceramics |
| — | — | $Li_4B_7O_{12}Cl$ | state: ceramics combine PEG as organic compound |
| — | — | $Li_4GeS_4$—$Li_3PS_4$ based crystal $Li_{3.25}Ge_{0.25}P_{0.75}S_4$ (thio-LISICON Li ion conductor) | state: ceramics |
| — | Li metal In metal | $0.01Li_3PO_4$—$0.63Li_2S$—$0.36SiS_2$ (thio-LISICON Li ion conductor) | state: ceramics |
| $LiCoO_2$ $LiFePO_4$ $LiMn_{0.6}Fe_{0.4}PO_4$ $LiNi_{0.8}Co_{0.15}Al_{0.05}O_2$ | Li metal $V_2O_5$ Li metal | $Li_3PO_{4-x}N_x$(LIPON) (lithium phosphate oxinitride glass) | state: glass |
| | | $Li_3InBr_3Cl_3$ (rock salt type Li ion conductor) | state: ceramics |
| — | — | $70Li_2S \cdot (30-x)P_2S_5 \cdot xP_2O_5$ ($Li_2S$—$P_2S_5$—$P_2O_5$ based glass ceramics) | state: glass |
| $LiCoO_2$ etc. | Li metal Sn based oxide | $Li_2O$—$B_2O_3$—$P_2O_5$ base, $Li_2O$—$V_2O_5$—$SiO_2$ base, $Li_2O$—$TiO_2$—$P_2O_5$ base, LVSO etc. | state: glass |
| — | — | $LiTi_2(PO_3)_4$(LTP) (NASICON type structure) | state: ceramics |

TABLE 3

| Cathode material | Anode material | Polymer base | Remarks |
|---|---|---|---|
| Ni based collector | Li metal | acrylonitrile vinyl acetate (PAN-VAc based gel electrolyte) | solvent: EC + PC electrolyte salt: $LiBF_4$, $LiPF_6$, $LiN(CF_3SO_2)_2$ |
| lithium electrode | lithium electrode | triethylene glycolmethyl methacrylate (polymethyl methacrylate (PMMA) based gel electrolyte) | solvent: EC + PC electrolyte salt: $LiBF_4$ |
| $V_2O_5$/PPy composite body | Li metal | methyl methacrylate (PMMA gel electrolyte) | solvent: EC + DEC electrolyte salt: $LiClO_4$ |
| Li metal | Li metal | PEO/PS polymer blend gel electrolyte | solvent: EC + PC electrolyte salt: $LiClO_4$ |
| Li metal | Li metal | alkylene oxide based polymer electrolyte | solvent: PC electrolyte salt: $LiClO_4$ |
| Li metal & $LiCoO_2$ | Li metal | alkylene oxide based polymer electrolyte | solvent: EC + GBL electrolyte salt: $LiBF_4$ |
| Li metal | Li metal | polyolefin based base polymer | solvent: EC + PC electrolyte salt: $LiBF_4$ |
| $Li_{0.36}CoO_2$ | Li metal | polyvinylidenefluoride (PVdF) + propylene hexafluoride (HFP) (PVdF-HFP gel electrolyte) | solvent: EC + DMC electrolyte salt: $LiN(CF_3SO_2)_2$ |
| $LiCoO_2$ | Li metal | PEO based and aclyl based polymer | solvent: EC + PC electrolyte salt: $LiBF_4$ |
| Li metal | Li metal | trimethylol propane ethoxylate acrylate (ether based polymer) | solvent: PC electrolyte salt: LiBETI, $LiBF_4$, $LiPF_6$ |
| — | — | EO-PO copolymer | electrolyte salt: LiTFSI, $LiBF_4$, $LiPF_6$ |
| — | — | poly aziridine compound | solvent: EC + DEC electrolyte salt: $LIPF_6$ |
| — | PAS (polyacene) | PVdF-HFP gel electrolyte | solvent: PC, EC + DEC electrolyte salt: $LiClO_4$, $Li(C_2F_5SO_2)_2N$ |
| — | — | urea based lithium polymer gel electrolyte | solvent: EC + DMC electrolyte salt: $LiPF_6$ |
| — | — | polyether/polyurethane based (PEO-NCO) gel electrolyte | solvent: PC electrolyte salt: $LiClO_4$ |
| — | — | cross-linked polyalkylene oxide based gel polymer electrolyte | — |

It most cases, the electrolyte used in a secondary battery is liquid. By way of example, in a lead storage battery, dilute sulfuric acid is used as the electrolytic solution. Positive collector electrode 23 and negative collector electrode 21 have some degree of strength. In Embodiment 1, each of the plurality of bipolar secondary batteries 4 is sandwiched between positive collector electrode 23 and negative collector electrode 21. When positive collector electrode 23 and negative collector electrode 21 are sandwiched between bipolar secondary batteries 4, a space between positive collector electrode 23 and bipolar secondary battery 4 or a space between negative collector electrode 21 and bipolar secondary battery 4 can be eliminated. Thus, strength of battery assembly 100 can be ensured.

Figure 6:
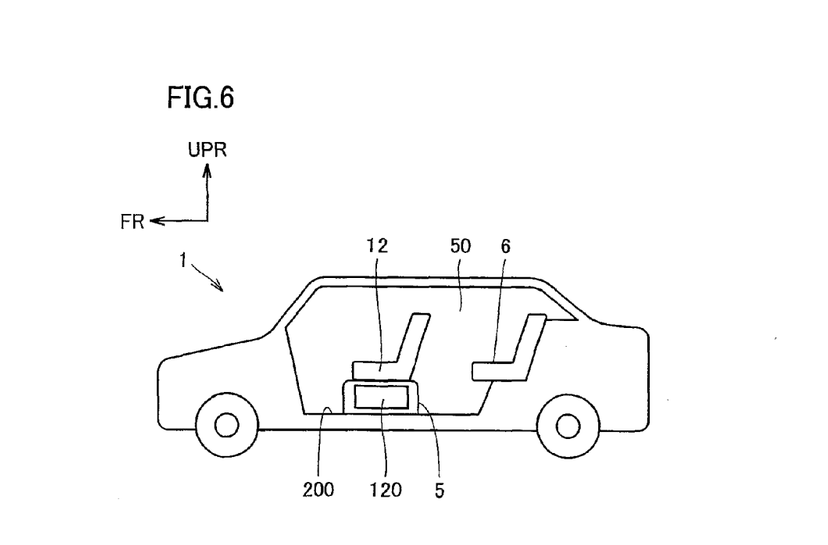
FIG. 6 is a schematic cross-sectional view showing an embodiment of a vehicle mounting the battery assembly in accordance with the first embodiment.

FIG. 6 is a schematic cross-sectional view showing a vehicle mounting battery assembly 100 in accordance with Embodiment 1.

Referring to FIG. 6, a vehicle 1 is, for example, an electric vehicle using a rechargeable electric power supply as a power source, or a hybrid vehicle using an internal combustion engine such as a gasoline engine or a diesel engine and a rechargeable electric power supply as the power sources. Battery assembly 100 shown in FIG. 1 is mounted as a power source in such a vehicle.

In a passenger space (vehicle interior) 50 of vehicle 1, a front seat 12 and a rear seat 6 are arranged. In the passenger space 50, battery pack 120 including battery assembly 100 shown in FIG. 1 is arranged below front seat 12. Battery pack 120 is surrounded by a cover 5 arranged below front seat 12 and a floor 300. It is easier to make a space for housing battery pack 120 below front seat 12, than at other portions of vehicle 1. In most cases, a vehicle body consists of a portion that collapses and a portion that does not collapse but protects an occupant or occupants at the time of a crash. Specifically, by arranging battery pack 120 below front seat 12, it becomes possible to protect battery assembly 100 against any shock, if the vehicle body is hard hit.

(Embodiment 2)

Referring to FIGS. 7 to 13, a cooling apparatus for a battery assembly in accordance with Embodiment 2 of the present invention will be described. The same components as in the battery assembly 100 and its cooling apparatus 200 in accordance with Embodiment 1 above are denoted by the same reference characters, and description thereof will not be repeated.

Figure 7:
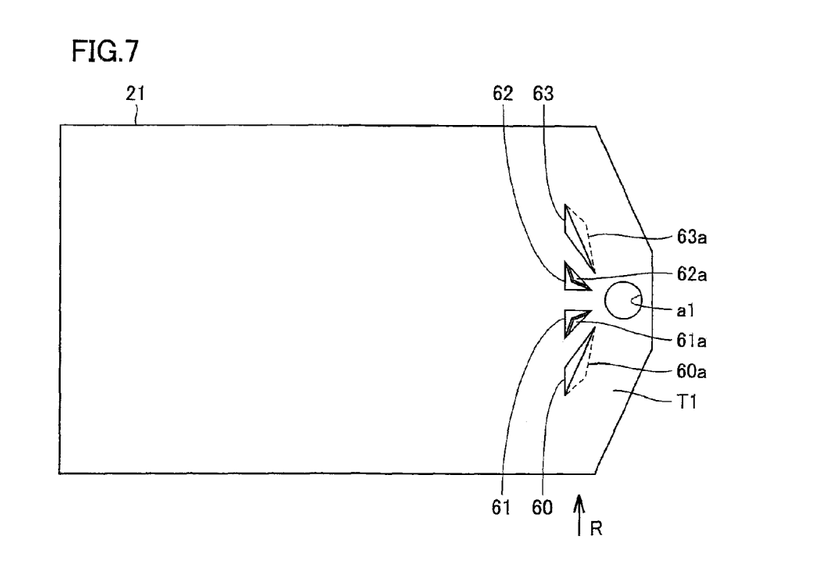
FIG. 7 is a plan view of a negative collector electrode 21 provided in the battery assembly in accordance with a second embodiment.

FIG. 7 is a plan view of negative collector electrode 21 provided at battery assembly 100 in accordance with Embodiment 2. As shown in FIG. 7, openings 60 to 63 are formed around connection hole a1 of terminal portion T1.

Around the openings 60 to 63, guide walls 60a to 63a are formed for guiding cooling air shown in FIG. 1 to openings 60 to 63.

Guide walls 60a to 63a are formed by cutting and folding parts of terminal portion T1, when openings 60 to 63 are formed. Therefore, guide walls 60a to 63a can be formed without increasing the number of components.

When air flows from the direction R shown in FIG. 7, the air is guided by guide walls 60a to 63a to openings 60 to 63.

Therefore, the air supplied by fan 53 shown in FIG. 1 to terminal portions T1 and T2 passes through openings 60 to 63, and flows threading through front and rear surfaces of terminal portions T1 and T2. Therefore, flow path of the air passing through terminal portions T1 and T2 becomes longer, and the distance over which heat exchange takes place between the air and the surfaces of terminal portions T1 and T2 increases. Thus, terminal portions T1 and T2 can be cooled well.

Heat generation is highest at the connection hole a1 that is in contact with wire U1. By arranging openings 60 to 63 and guide walls 60a to 63a around connection hole a1, heat generated at connection hole a1 can effectively be radiated. This reduces temperature increase of terminal portion T1. Partial degradation of electrode sheet 25 shown in FIG. 5, caused when only a part of the sheet positioned close to terminal portion T1 has its temperature increased and electrode reaction at that portion is activated, can be prevented.

Further, guide walls 60a to 63a guide air and are cooled by heat exchange with the air, contributing to cooling of battery assembly 100.

In the present embodiment, fan 53 is adopted as the air supplying mechanism. An air inlet that takes in air as the vehicle moves may be adopted.

Figure 8:
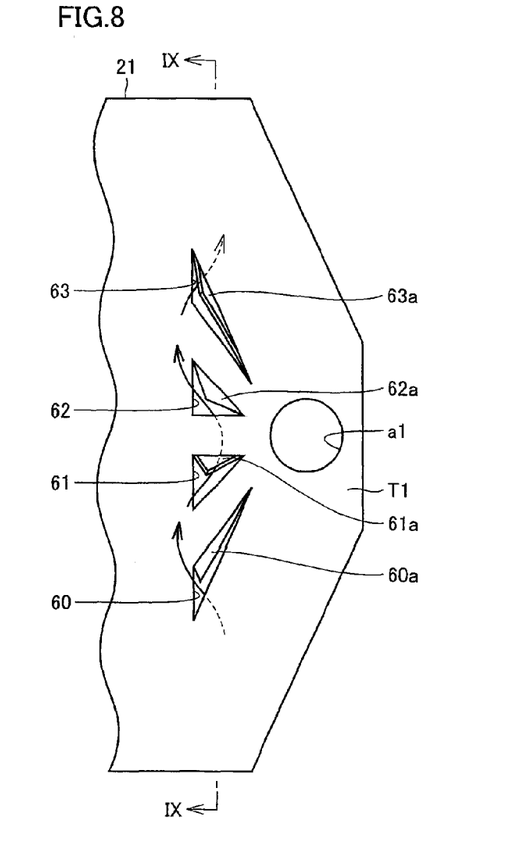
FIG. 8 is a plan view showing in detail openings and guide walls formed in the negative collector electrode.
Figure 9:
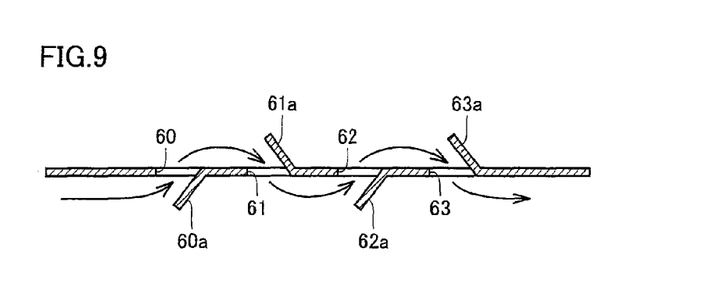
FIG. 9 is a cross-sectional view taken along the line IX-IX of FIG. 8.

FIG. 8 is a plan view showing an example, different from that of FIG. 7, of the arrangement of guide walls 60a to 63a, and FIG. 9 is a cross-sectional view taken along the line IX-IX of FIG. 8.

As shown in FIGS. 8 and 9, guide walls 60a to 63a include guide walls 60a and 62a that guide the air from the rear surface side to the front surface side of terminal portion T1 and guide walls 61a and 63a guiding the air from the front surface side to the rear surface side, arranged alternately.

By arranging guide walls 60a to 63a in this manner, longer air flow path can be provided, and terminal portion T1 can be cooled satisfactorily.

Figure 10:
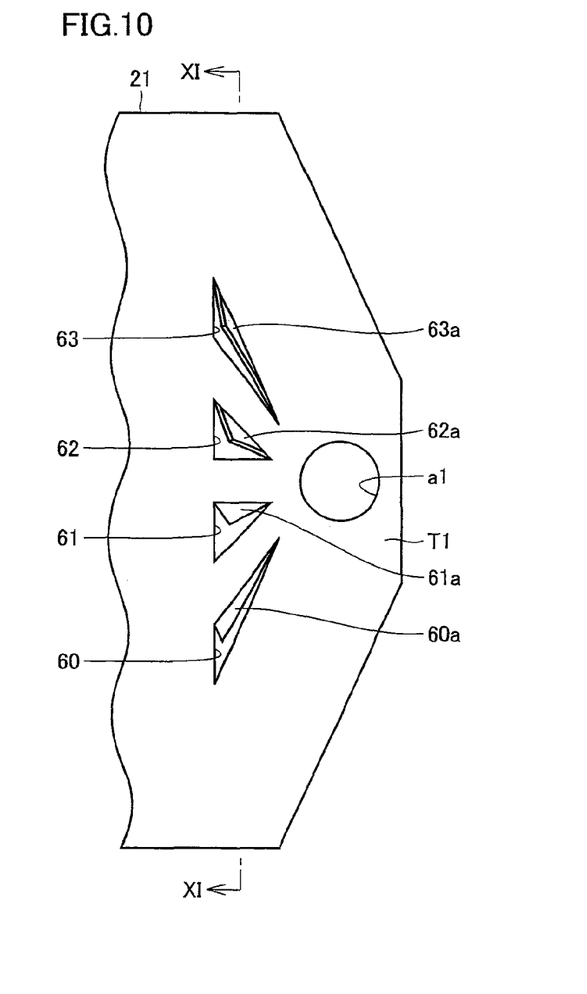
FIG. 10 is a plan view showing a first modification of a terminal portion.
Figure 11:
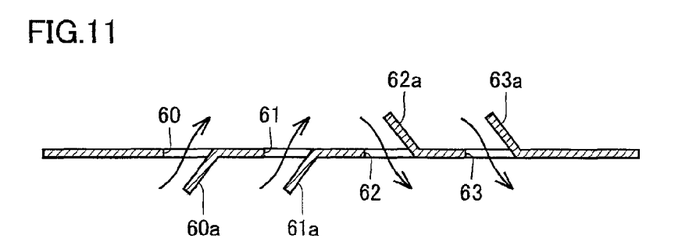
FIG. 11 is a cross-sectional view taken along the line XI-XI of FIG. 10.

FIG. 10 is a plan view showing a first modification of terminal portion T1, and FIG. 11 is a cross-sectional view taken along the line XI-XI of FIG. 10.

As shown in FIGS. 10 and 11, of the guide walls 60a to 63a, guide walls 60a and 63a formed on the upstream side of air passage may be inclined such that the air is guided from the rear surface side to the front surface side of terminal portion T1, and guide walls 61a and 62a formed on the downstream side may be inclined such that the air is guided from the front surface side to the rear surface side of terminal portion T1.

By inclining each of the guide walls 60a to 63a in this manner, longer air flow path can be provided, and air flow resistance is made smaller, so that fresh air can successively be supplied to housing 51.

Figure 12:
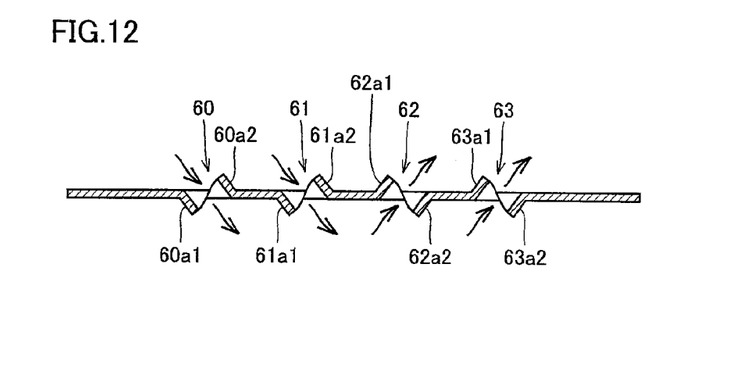
FIG. 12 is a cross-sectional view showing a second modification of the terminal portion.

FIG. 12 is a cross-sectional view showing a second modification of terminal portion T1, and as shown in FIG. 12, at opening edges of openings 60 to 63, guide walls 60a1 to 63a2 may be formed at upstream and downstream portions in the direction of air flow.

Figure 13:
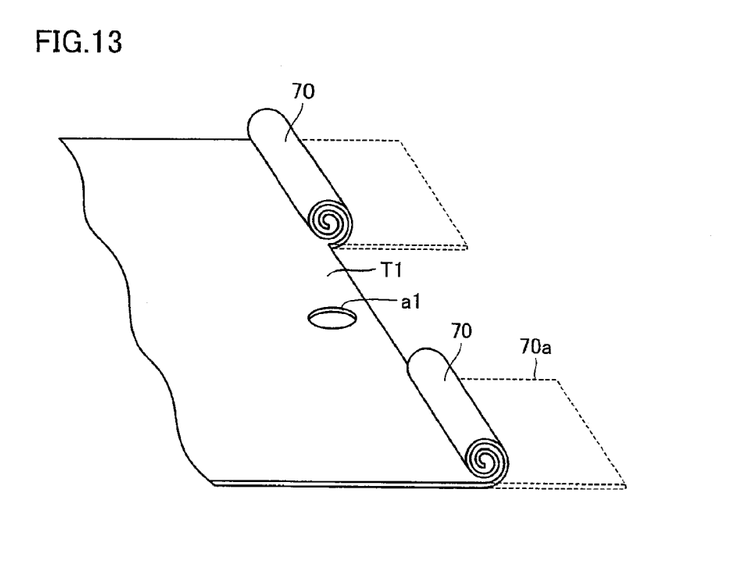
FIG. 13 is a perspective view showing a third modification of the terminal portion.

FIG. 13 is a perspective view showing a third modification of terminal portion T1. As shown in FIG. 13, rolled members 70 may be formed on opposite sides of connection hole a1, by rolling parts of terminal portion T1. Rolled members 70 are formed on opposite sides of connection hole a1, by rolling portions 70a extending outward than connection hole a1. Rolled members 80 are arranged such that opposite end portions are arranged along the flow direction of supplied air.

Rolled member 70 is rolled to form spaces inside and, therefore, when air is fed from one end surface, the air escapes from the other end surface. By the air flowing through rolled member 70, rolled member 70 is cooled, and battery assembly 100 can be cooled. As the rolled member 70 has large surface, the effect of cooling battery assembly 100 can be improved.

Alternatively, the surface area of terminal portion T1 may be increased by curving terminal portion T1 in a wavy shape, or by forming protrusions/recesses at terminal portion T1, to improve the effect of heat radiation at terminal portion T1.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The present invention is applicable to a battery assembly formed by stacking a plurality of battery cells, and it is particularly suitable to a battery assembly formed by stacking a plurality of bipolar secondary batteries.

The invention claimed is:

1. A battery assembly, comprising:
    a secondary battery formed by stacking a plurality of unit battery cells having a cathode and an anode;
    a collector electrode provided on each end surface of said secondary battery positioned in the stacking direction of said unit battery cells; and
    a terminal portion formed at said collector electrode, protruded outward from a side surface of said secondary battery, to which a conductive member is connected for charging and discharging;

wherein a coolant is supplied to said terminal portion to cool said terminal portion, and a vent hole is formed in said terminal portion, allowing flow of said coolant, further comprising a connecting portion formed in said terminal portion, to which said conductive member is connected, wherein said vent hole is formed in said terminal portion and around said connecting portion.

2. The battery assembly according to claim 1, further comprising a guide wall formed around said vent hole, guiding said coolant to said vent hole.

3. A battery assembly, comprising:
a secondary battery formed by stacking a plurality of unit battery cells having a cathode and an anode;
a collector electrode provided on each end surface of said secondary battery positioned in the stacking direction of said unit battery cells, and
a terminal portion formed at said collector electrode, protruded outward from a side surface of said secondary battery, to which a conductive member is connected for charging and discharging;
wherein a coolant is supplied to said terminal portion to cool said terminal portion, and a vent hole is formed in said terminal portion, allowing flow of said coolant;
further comprising
a collector foil provided between said unit battery cells, wherein said collector electrode is formed to be thicker than said collector foil.

4. A battery assembly, comprising:
a secondary battery formed by stacking a plurality of unit battery cells having a cathode and an anode, a collector electrode provided on each end surface of said secondary battery positioned in the stacking direction of said unit battery cells, and a terminal portion formed at said collector electrode, protruded outward from a side surface of said secondary battery, to which a conductive member is connected for charging and discharging;
wherein a coolant is supplied to said terminal portion to cool said terminal portion, said secondary battery includes first and second secondary batteries stacked to have said cathodes opposed to each other or said anodes opposed to each other; said collector electrode has a first collector electrode provided between said first secondary battery and said second secondary battery for electrically connecting said first secondary battery and said second secondary battery, and a second collector electrode of a polarity different from that of said first collector electrode, formed on a surface of said first secondary battery positioned opposite to the surface on which said first collector electrode is formed; and
said terminal portion has a first terminal portion provided on said first collector electrode and a second terminal portion provided on said second collector electrode,
wherein a vent hole is formed in at least one of said first and second terminal portions, allowing flow of said coolant, and a guide wall formed in at least one of said first and second terminal portions and around said vent hole, guiding said coolant to said vent hole; and
further comprising a connecting portion formed in at least one of said first and second terminal portions, to which said conductive member is connected, wherein said vent hole is formed in said terminal portion and around said connecting portion.

\* \* \* \* \*